United States Patent [19]

Kita et al.

[11] 3,979,563

[45] Sept. 7, 1976

[54] COMMUNICATION SYSTEMS OF KEY TELEPHONE SYSTEMS

[75] Inventors: Gunzo Kita; Kouichi Ohyama, both of Tokyo, Japan

[73] Assignee: Iwatsu Electric Co., Ltd., Tokyo, Japan

[22] Filed: Mar. 13, 1975

[21] Appl. No.: 557,909

[30] Foreign Application Priority Data

Mar. 19, 1974 Japan............................ 49-30639

[52] U.S. Cl................................ 179/99; 179/1 HF; 179/1 VC; 179/81 B
[51] Int. Cl.².......................................... H04M 1/60
[58] Field of Search............... 179/1 HF, 1 VC, 1 H, 179/18 AD, 81 B, 99

[56] References Cited
UNITED STATES PATENTS

| | | | |
|---|---|---|---|
| 2,892,033 | 6/1959 | Corrigan | 179/1 H |
| 3,055,979 | 9/1962 | Shimizu | 179/81 B |
| 3,126,448 | 3/1964 | Millett | 179/1 H |
| 3,743,791 | 7/1973 | Duff et al. | 179/99 |
| 3,860,756 | 1/1975 | Shinoi et al. | 179/1 HF |
| 3,872,262 | 3/1975 | Kerman | 179/99 |

Primary Examiner—Kathleen H. Claffy
Assistant Examiner—Randall P. Myers
Attorney, Agent, or Firm—Oblon, Fisher, Spivak, McClelland & Maier

[57] ABSTRACT

In a communication system of a key telephone system wherein a key telephone selected by electric power supplied from a key service unit is started through a signal line for performing an independent calling, the key service unit is provided with a voice switch adapted to switch between transmission and reception of speech, each key telephone is provided with answer signal sending means including a microphone, and a common line is connected to the outputs of the answer signal sending means of respective key telephones for sending the outputs to the voice switch, thus permitting a selected key telephone to perform a hand-free communication.

8 Claims, 2 Drawing Figures

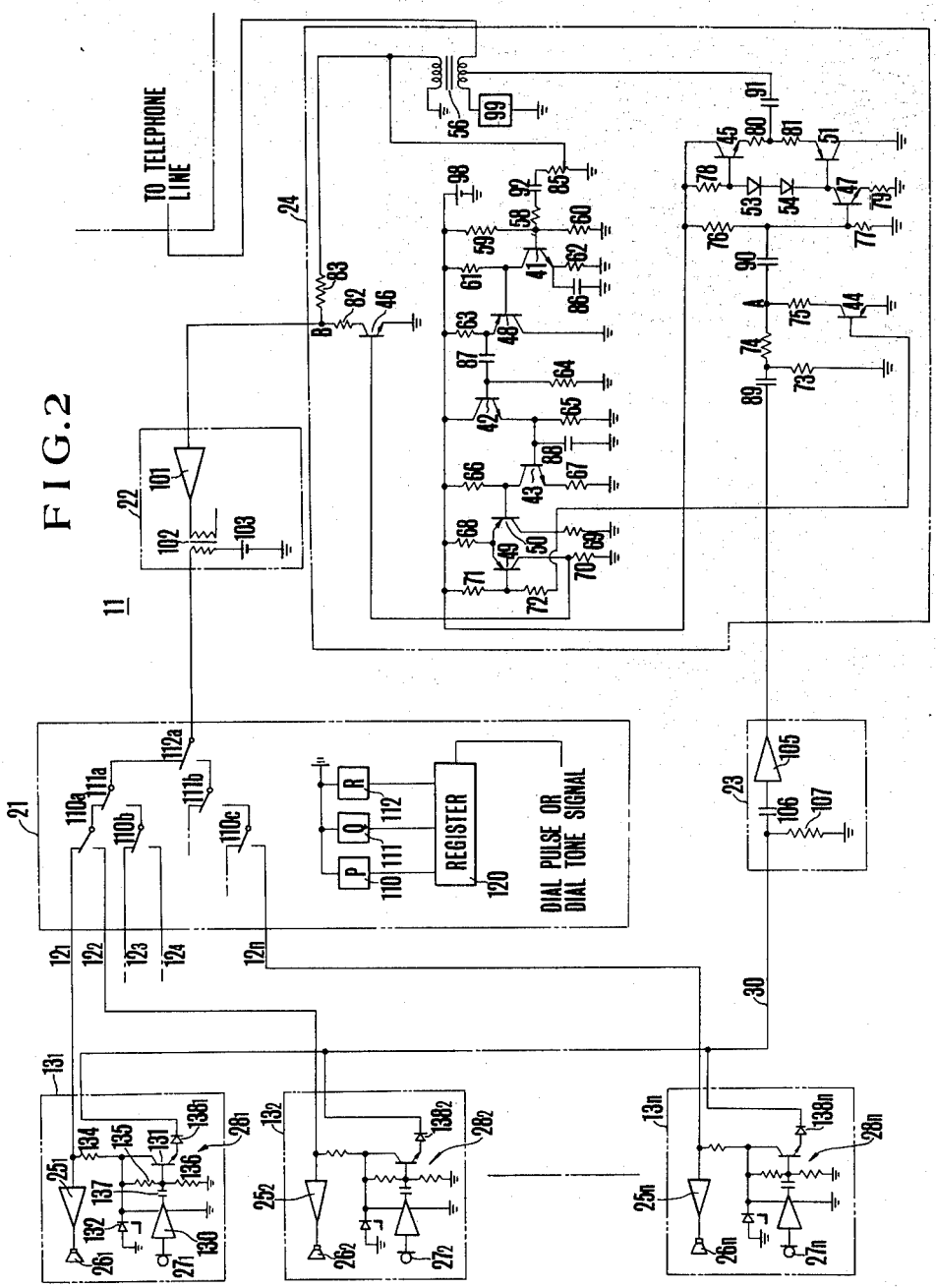

COMMUNICATION SYSTEMS OF KEY TELEPHONE SYSTEMS

BACKGROUND OF THE INVENTION

This invention relates to a communication system of a key telephone system wherein keys are used to select an office line and to hold the called line for calling an intercom line and more particularly to a communication system of a key telephone system wherein a key telephone or a station selected by the current supplied from key service unit is started to perform an individual call.

Such communication system of a key telephone has been well known in the art. For example, it is described in Chapter 3.1 Method of Calling Extension of the article entitled "Utilization of a Push Key Telephone" by G. Kita, A. Obata, et al. on pages 37 to 39 of IWATSU GIHO, Nov. 31, 1972, published by IWATSU. In such a system, a selection circuit for the key service unit is selected by the operation of a predetermined dial or key which is provided on the telephone constituting this system, for sending a call signal to a particular key telephone whereby the loudspeaker of the key telephone produces a voice signal or a call signal having a particular audible frequency. To respond to such call the called party must take up his handset. If the called party is sitting at a place remote from the handset he must walk to the handset. If the called party is absent when a call is made, the calling party must wait a long time.

SUMMARY OF THE INVENTION

Accordingly, it is an object of this invention to provide an improved communication system of a key telephone system by which the called party can make a hand-free communication without performing any particular operation.

Another object of this invention is to provide a novel communication system of a key telephone system which enables ready hand-free communication by merely adding simple elements to a prior art key telephone system.

Still another object of this invention is to provide an improved communication system of a key telephone system wherein the calling party is not required to continue useless calling where the called party is absent.

According to this invention there is provided a communication system of a key telephone system wherein a key telephone or a station selected by electric power supplied from a key service unit is started through a signal line for performing an independent calling characterized in that the key service unit comprises a voice switch adapted to switch between transmission and reception of a speech, that each key telephone comprises answer signal sending means including a microphone, that the answer signal sending means is rendered operative by the power supplied over a signal line and that a single common answer signal line is connected to the outputs of respective answer signal sending means whereby when a particular key telephone is called, the voice switch operates to switch between the transmission and reception of the speech in response to a call signal and an answer signal thus permitting the selected key telephone to perform a hand-free communication.

BRIEF DESCRIPTION OF THE DRAWINGS

In the accompanying drawings:

FIG. 1 is a block diagram showing a basic construction of the novel communication system of a key telephone system embodying the invention and FIG. 2 is a block diagram showing the detail of some important elements of the system shown in FIG. 1 which are necessary to understand the invention.

DESCRIPTION OF THE PREFERRED EMBODIMENT

Figure 1:
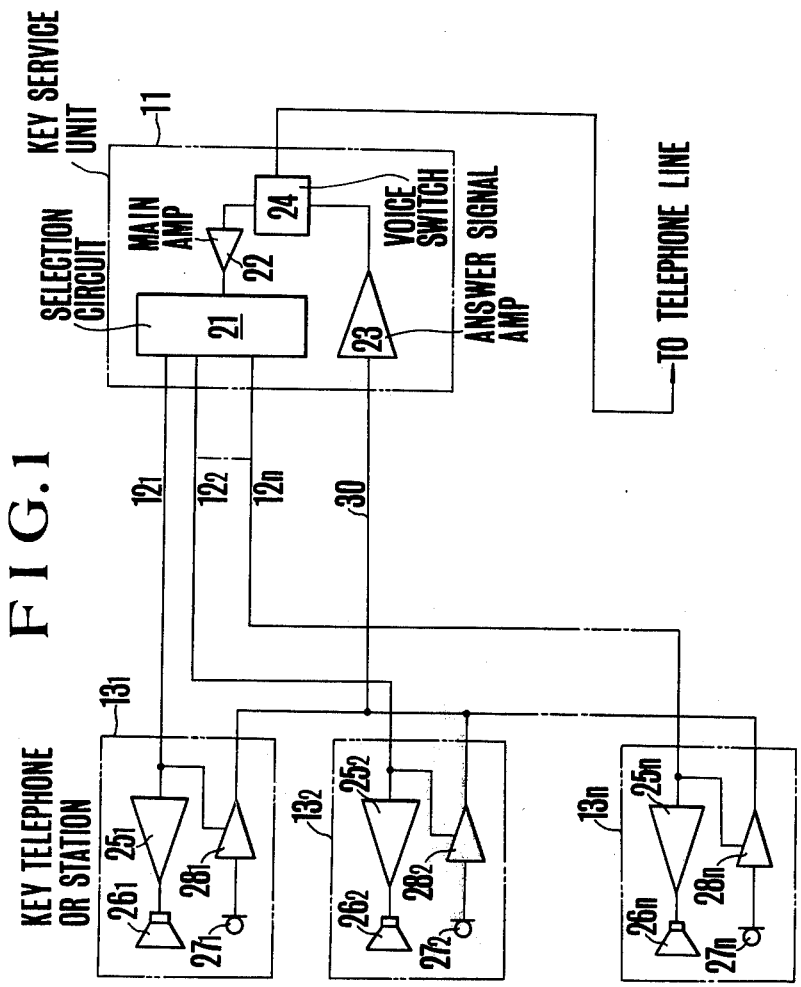

With reference now to FIG. 1, the communication system shown therein comprises main apparatus 11 and n key telephones $13_1$ through $13n$ which are connected to the key service unit via call signal lines $12_1$ through $12n$. The key service unit 11 is constituted by a selection circuit 21 for interconnecting selected one of the call signal lines $12_1$ through $12n$ and a telephone line, a main amplifier 22 connected to supply an output to the selection circuit 21, an answer signal amplifier 23 and a voice switch 24 for supplying the signal over the telephone line to the input of the main amplifier 22 and for sending out the signal from the answer signal amplifier 23 to the telephone line. The key telephones $13_1$ through $13n$ comprise amplifiers $25_1$ through $25n$ for amplifying call signals sent from the selection circuit 21 of the key service unit over call signal lines $12_1$ through $12n$, loudspeakers $26_1$ through $26n$ for converting the outputs of the amplifiers $25_1$ through $25n$ into voices, microphones $27_1$ through $27n$ and microphone amplifiers $28_1$ through $28n$ for amplifying the electric signals sent from respective microphones $27_1$ through $27n$. Amplifiers $25_1$ through $25n$ and amplifiers $28_1$ through $28n$ in the key telephones are connected to be supplied with electric power from the selection circuit 21 or the main amplifier 22 of the key service unit over call signal lines $12_1$ through $12n$. Thus, the call signal lines $12_1$ through $12n$ function to transmit not only the call signals but also the operation power. Furthermore, the outputs from the microphone amplifiers $28_1$ through $28n$ of the key telephones $13_1$ through $13n$ are applied to the input of the answer signal amplifier 23 of the key service unit through a common answer signal line 30. Generally, in a key telephone system, a cable utilized to interconnect the key service unit and the key telephones contains some idle or spare lines in addition to the call signal lines so that it is possible to use one of the spare lines as the answer signal line.

The voice switch 24 utilized in this example functions to control the call signal and the answer signal for switching between transmission and reception of a speech. The purpose of such control is to prevent occurrence of an oscillation between the key service unit and the key telephones. Such control may be a calling side control which is the one side control of the transmission or reception or a comparison control in which a call signal is compared with the condition of a line over which signals are sent as in the case of a conventional hand-free communication.

It is to be understood that circuits shown in FIG. 1 only represent the essential circuit for key service unit and respective key telephones in accordance with the invention which result from application of the invention to the necessary part of the circuit used in the conventional key telephone.

The communication system shown in FIG. 1 operates as follows. Where it is desired to transfer a signal received by the key telephone system or to call a local subscriber in the system, a key telephone set is manipulated. Then the selection circuit 21 operates according to the operation of an ordinary key telephone system thereby connecting a called key telephone to the telephone line through the selection circuit 21, main amplifier 22 and voice switch 24. Thus for example, when a voice signal, a low frequency signal or a pulse signal is sent over the telephone line for calling a key telephone $13_1$, this signal is amplified by amplifier $25_1$ in the key telephone $13_1$ for energizing the loudspeaker $26_1$, thus performing a calling operation.

During this operation as the power for operating the amplifier $25_1$ of the called key telephone $13_1$ is also supplied through the call signal line $12_1$ of the called key telephone the microphone amplifier $28_1$ thereof will be started. Since power is not supplied to other call signal lines $12_2$ through $12n$ for not called key telephones $13_2$ through $13n$, microphone amplifiers $28_2$ through $28n$ will not be started. When the owner of the called key telephone or a man situated near the called key telephone responds by voice, the voice is picked up by the microphone $27_1$ to be connected into an electric signal which is amplified by the microphone amplifier $28_1$ and then sent to the answer signal line 30. The signal is amplified by the answer signal amplifier 23 and then sent to the telephone line via the voice switch 24. Similar operations are also performed when other key telephones are called.

FIG. 2 is a block diagram showing a detailed connection of certain elements that characterize the invention, in which elements corresponding to those shown in FIG. 1 are designated by the same reference numerals. In FIG. 2, the voice switch 24 is constituted by NPN transistors 41 through 47, PNP transistors 48 through 51, diodes 53 and 54, a transformer 56 having an intermediate tap, resistors 58 through 83, capacitors 86 through 92, a variable resistor 85, a battery 98 and a balancing network 99. Transistors 49 and 50 constitute a differential amplifier with two emitter electrodes coupled together for comparing a voltage appearing at the juncture between resistors 71 and 72 with the base voltage of transistor 50 thus comparing the conditions of a call signal channel and of a reply signal channel. According to the result of the comparison, transistors 46 and 44 for interrupting respective signal lines are controlled. Transistors 45 and 51 are connected complemetarily to provide push-pull operation. Transistors 45 and 51 are connected to be driven by transistor 47. Between the base electrode of transistor 43 and the ground are connected in parallel a capacitor 88 and resistor 65 for maintaining the condition before switching of the voice switch for a predetermined interval even after switching thereof, or even after switching the condition from a calling condition in which a call signal has been applied to a call signal channel to an answer condition in which a response signal has been applied to the answer signal channel, or even after switching the answer condition to a calling condition. The values of the capacitor 88 and resistor 65 are selected to provide a predetermined interval of 500 ms, for example. The balancing network 99 is used for the purpose of matching the impedances of the telephone circuit and of the communication system.

Transistors 49 and 50 comprising a differential amplifier operate as follows. Thus, when a call signal or a response signal is not supplied to the voice switch, transistor 50 is maintained in the OFF state whereas transistor 49 is fully conductive. As a consequence, transistor 44 is nonconductive whereas transistor 46 is conductive.

When an AC call signal is applied to the voice switch 24 from the telephone line for a definite interval, this signal will appear on the secondary side of transformer 56. The call signal on the secondary side is applied to the base electrode of transistor 41 via variable resistor 85, capacitor 92 and resistor 58. Thus the AC call signal is amplified by transistor 41. The output of transistor 41 is applied to the base electrode of transistor 43 through transistors 48 and 42. Since a holding circuit comprising capacitor 88 and resistor 65 is connected to the base electrode of transistor 43, this transistor functions to drive transistor 50 to become more conductive while the call signal is being applied to the voice switch 24 thus increasing the collector current of transistor 50. As a consequence, transistor 44 becomes conductive whereby the potential of point A is decreased for preventing the output from the response signal amplifier 23 from being sent over the telephone line. Concurrently therewith transistor 49 becomes less conductive opposite to transistor 50 thus decreasing the collector potential of transistor 49. For this reason, transistor 46 is rendered nonconductive, and the potential at point B increases. Accordingly, the signal appearing on the secondary side of transformer 56 of the voice switch 24 will be applied to the main amplifier 22 through resistor 83.

When the call signal ceases, the voice switch 24 returns to the original condition and the charge accumulated in capacitor 88 is discharged through resistor 65 thus rendering nonconductive transistors 43 and 50. At the same time transistor 44 becomes nonconductive and transistor 46 becomes conductive.

Under these conditions, when an answer signal is sent to the voice switch 24 from the answer signal amplifier 23, this signal is applied to the base electrode of transistor 47 via capacitor 89, resistor 74 and capacitor 90. The output of transistor 47 is amplified by transistors 45 and 51 and then sent out to the telephone line through the intermediate tap on the primary side of transformer 56.

The main amplifier 22 is constituted by an amplifier 101, a transformer 102 and a battery 103 connected in series with the secondary winding of transformer 102. The answer signal amplifier 23 is constituted by an amplifier 105, a capacitor 106 and a resistor 107.

The selection circuit 21 is constituted by the coils 110, 111 and 112 of relays P, Q and R, and their contacts 110a – 110c, 111a, 111b and 112a. Although the numbers of the relays and relay contacts are different dependent upon the number of the key telephones to be selected, it should be understood that the relays and their contacts shown in the drawing are only a portion thereof. The coils 110, 111 and 112 of relays P, Q and R are connected to the output side of a register 120 which constitutes the key service unit 11 and stores dial pulses or dial tone signals acting as the depending machine selecting signals. Accordingly, when a dial pulse or a dial tone signal is applied to the register 120 the combination of the operations of relays P, Q and R varies. When the relay contacts are brought to the positions shown in the drawing by the operations of relays P, Q and R, the key telephone $13_1$ is selected. At this time, the call signal line $12_1$ is connected to the secondary winding of transformer 102 and battery 103 of the main amplifier via relay contacts 110a, 111a and 112a. Accordingly the operating power is supplied to the key telephone $13_1$ from battery 103 through call signal line $12_1$. At the same time a call signal is sent to the key telephone $13_1$ from the transformer 102.

When another dial pulse or dial tone signal is supplied to the register 120 so that only relay P is energized thus switching contacts 110a through 110c, the key telephone $13_2$ will be selected. A similar operation is done when still another dial impulse or dial tone signal is applied to the register 120 for selecting another key telephone.

As a typical one of the microphone amplifiers installed in respective key telephones, the construction of amplifier $28_1$ will be described hereunder. This amplifier comprises an amplifier 130 connected to the output of microphone $27_1$, an NPN transistor 131, a Zener diode 132, resistors 134, 135 and 136, a capacitor 137 and a diode $138_1$ which are connected as shown. The purpose of the Zener diode 132 is to prevent variation of the operating voltage supplied to the key telephone $13_1$ from the key service unit 11 through call signal line $12_1$ and resistor 134. The transistor 131 with its base electrode connected to the output of the amplifier 130 via capacitor 137 is connected to form an emitter follower circuit thus applying a low impedance output upon the answer signal line 30 through diode $138_1$. More particularly, the emitter electrode or the output electrode of the transistor 131 is connected in parallel, respectively through diode $138_1$, with the emitter electrodes of corresponding transistors of the output stages for response signals of other key telephones. The emitter electrode of the transistor 131 comprises an emitter follower circuit together with the resistor 107 in the response signal amplifier 23 of the key service unit 11, said emitter follower circuit acting as a switch for the response signal channel. Diode $138_1$ is used for the purpose of preventing the reverse flow of the current to the key telephone $13_1$ when other key telephones $13_2$ through 13n respond thereby destructing transistor 131.

As the key telephone $13_1$ is called and when the user of this key telephone replies, his voice enters into the microphone $27_1$ and converted into an electric signal which is impressed upon the base electrode of transistor 131 through capacitor 137 after being amplified by the microphone amplifier 130. This signal is converted into a low impedance signal by the action of transistor 131, the output thereof being supplied to the answer signal line 30 through diode $138_1$.

As has been described hereinabove, according to this invention, microphones are provided for respective key telephones of a prior art key telephone system and the call signal and the answer signal are controlled by a voice switch installed in the key service unit by utilizing a common answer signal line so that it is possible to readily perform hand-free communication by merely adding a simple element thereby enabling the called party to respond promptly. Moreover, the called party can readily respond and speak even at a place remote from the microphone without performing any such particular operation as taking up the handset. Since such hand-free communication is possible, where no one is present near the called key telephone when the voice switch in the key service unit is controlled by a signal sent from the calling party, the calling party can ascertain the condition of the called party through the microphone thereof. Accordingly, it is not necessary for the calling party to continue calling in vain until the called party responds as in the prior art system in which it has been impossible to know the condition of the called party when he is absent.

Furthermore, according to this invention, it is not necessary to provide any particular switching means, such as a relay, for the key service unit as the means for receiving answer signals sent from the key telephones, thus simplifying the construction and reducing the cost. Moreover, it is possible to send out the answer signals at high fidelities irrespective of the number of the key telephones. Thus, the invention improves the function and reliability of the system.

Although, in the embodiment described, amplifiers $25_1$ through 25n are provided for respective key telephones, it will be clear that such amplifiers can be provided on the side of the key service unit, which may be amplifiers of the central type.

Where carbon microphones having high sensitivities are used as the microphones $24_1$ through 27n installed in respective key telephones, it is possible to omit microphone amplifiers $28_1$ through 28n.

Although the invention has been shown and described in terms of a preferred embodiment thereof, it should be understood that the invention is by no means limited to such particular embodiment and that many changes and modifications will be obvious to one skilled in the art without departing from the true spirit and scope of the invention as defined in the appended claims.

In the embodiment shown in FIG. 2, the emitter follower circuit is described as being constituted with the transistor of the key telephone and the input stage of the answer signal amplifier 23 in the key service unit. However, it should be noted that, within the key telephone, another emitter follower circuit can be possible in which the emitter electrode of the transistor 131 is grounded through a pertinent resistor. Further it should be noted that diodes $138_1$ through 138n can be omitted depending upon the circuit design condition.

What is claimed is:

1. A communication system for a key telephone system wherein a key telephone is selected by a key service unit and electric power is supplied through a signal line for performing an independent call, the key service unit comprising a voice switch adapted to switch between transmission and reception of speech, each key telephone comprising a loudspeaker, a loudspeaker amplifier and answer signal sending means comprising a microphone and a microphone amplifier, the answer signal sending means being rendered operative by the power supplied from said signal line, a single common answer signal line commonly connected to the outputs of respective answer signal sending means so that when a particular key telephone is called the voice switch operates to switch between the transmission and reception of the speech in response to a call signal and an answer signal permitting the selected key telephone to perform a hand-free communication, a selection circuit disposed between the voice switch and the loudspeaker amplifier, said microphone amplifier being disposed between the microphone and the voice switch, the selection circuit enabling one signal line to select the key telephone, start the loudspeaker amplifier and start the microphone amplifier.

2. The communication system according to claim 1 wherein said microphone included in said answer signal sending means comprises a carbon microphone.

3. The communication system according to Claim 1, wherein said voice switch is connected between a telephone line connected to the central office and the selection circuit in the key service unit for selecting the key telephones.

4. The communication system according to claim 1 wherein said key service unit comprises an answer signal amplifier for amplifying the answer signal from said common answer signal line and for applying the output of said answer signal amplifier to said voice switch.

5. The communication system according to claim 1 wherein said voice switch is provided with a holding circuit for maintaining a transmission condition for a definite interval after termination of transmission of the speech.

6. The communication system according to claim 1 wherein said answer signal sending means further comprises a transistor connected to the output of said microphone amplifier in an emitter follower configuration, said transistor being connected to be operable by the power supplied through said signal line.

7. The communication system according to claim 6 which further comprises a diode connected between said transistor and said answer signal line, said diode having a polarity to pass power to said transistor from said signal line.

8. The communication system according to claim 1 wherein said microphone amplifier is connected to receive operating power from said signal line through a resistor, and a Zener diode is connected between said resistor and said microphone amplifier.

* * * * *